(12) United States Patent  
Nishikita

(10) Patent No.: US 7,766,157 B2  
(45) Date of Patent: Aug. 3, 2010

(54) WEAR DETECTION DEVICE FOR CONVEYOR BELT

(75) Inventor: Yukinobu Nishikita, Yokohama (JP)

(73) Assignee: Bridgestone Corporation, Tokyo (JP)

( * ) Notice: Subject to any disclaimer, the term of this patent is extended or adjusted under 35 U.S.C. 154(b) by 321 days.

(21) Appl. No.: 12/065,855

(22) PCT Filed: Sep. 5, 2006

(86) PCT No.: PCT/JP2006/317547

§ 371 (c)(1),
(2), (4) Date: Mar. 5, 2008

(87) PCT Pub. No.: WO2007/029698

PCT Pub. Date: Mar. 15, 2007

(65) Prior Publication Data

US 2009/0266684 A1    Oct. 29, 2009

(30) Foreign Application Priority Data

Sep. 7, 2005   (JP) .............................. 2005-259264

(51) Int. Cl.
*B65G 43/02* (2006.01)

(52) U.S. Cl. .................................. 198/810.02; 340/676

(58) Field of Classification Search ................. 198/810.02–810.04; 340/676

See application file for complete search history.

(56) References Cited

U.S. PATENT DOCUMENTS

| | | | | |
|---|---|---|---|---|
| 4,657,131 A * | 4/1987 | Brychta et al. | ......... | 198/810.04 |
| 5,246,577 A * | 9/1993 | Fuchs et al. | ................. | 204/604 |
| 6,715,602 B1 * | 4/2004 | Gartland | ................ | 198/810.02 |
| 6,831,566 B1 * | 12/2004 | Kusel | ......................... | 340/676 |
| 7,222,727 B2 * | 5/2007 | Aisenbrey | .............. | 198/810.04 |

FOREIGN PATENT DOCUMENTS

| | | |
|---|---|---|
| EP | 0753472 A1 | 1/1997 |
| JP | 200435115 A | 2/2004 |
| JP | 2006315858 A | 11/2006 |
| WO | 2005005292 A1 | 1/2005 |

* cited by examiner

*Primary Examiner*—Mark A Deuble  
(74) *Attorney, Agent, or Firm*—Sughrue Mion, PLLC

(57) ABSTRACT

A wear detection device for a conveyor belt capable of automatically, easily, and accurately detecting the wear amount of the conveyor belt during the operation, formed in a simple structure, and manufacturable at low cost. A rubber magnet (3) magnetized in the thickness direction is buried in the conveyor belt (2) diagonally relative to both the advancing and thickness directions of the conveyor belt. A magnetic sensor (4) detecting the change of a magnetic force due to the wear of the rubber magnet (3) resulting from the wear of the conveyor belt (2) is disposed at a position through which the rubber magnet (3) is passed.

7 Claims, 4 Drawing Sheets

WEAR DETECTION DEVICE FOR CONVEYOR BELT

TECHNICAL FIELD

The present invention relates to a wear detector of a conveyor belt for detecting wear without contact to the conveyor belt.

BACKGROUND OF THE INVENTION

To detect wear of a conveyor belt, JP2004-35115A discloses a wear detector of a conveyor belt in which a wear detecting layer in the belt having different color such as white rubber from an elastic layer of the belt is embedded, exposure of the wear detecting layer enabling wear to be found.

A supersonic wave thickness meter determines thickness of a conveyor belt periodically to find wear when the conveyor belt does not run.

EP 0 753 472A1 or DE19 525 326A discloses that a plurality of transponders are embedded at different depths, any of the transponders broken or dropped out being detected by an antenna comprising a transmitting coil and a sensing coil close to the running belt to enable wear of the belt to be found.

However, in JP2004-35115A or supersonic wave thickness meter, instead of determination of wear automatically, wear is determined by a person when the conveyor belt does not run.

In EP 0 753 472A1, the transponders are widely embedded so that the size and cost of the device increase.

In view of the disadvantages in the prior art, it is an object of the present invention to provide a wear detector of a conveyor belt that enables wear of the conveyor belt to be detected automatically, exactly and easily during running of the belt, its structure being simple and inexpensive.

DETAILED DESCRIPTION OF PREFERRED EMBODIMENTS

Figure 1:
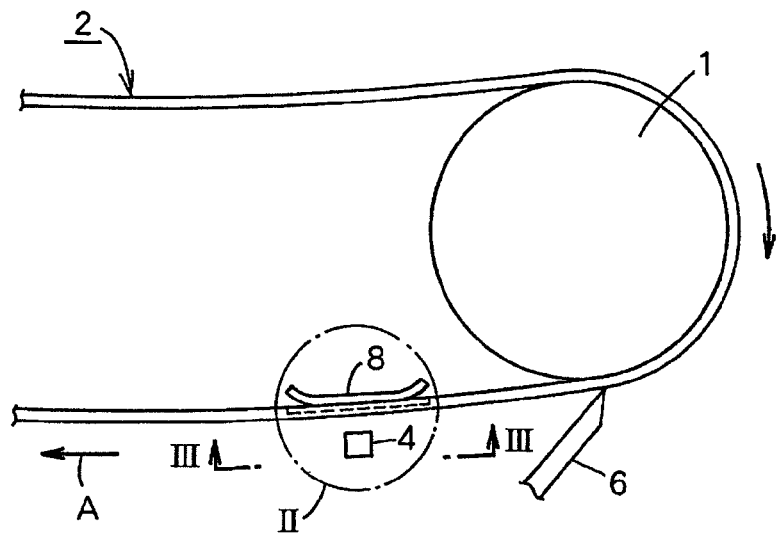
FIG. 1 is a side elevational view of an unloading side end of a conveyor belt comprising the first embodiment of the present invention.

FIG. 1 is a side elevational view of an unloading side end of a belt conveyor comprising the first embodiment according to the present invention.

Figure 2:
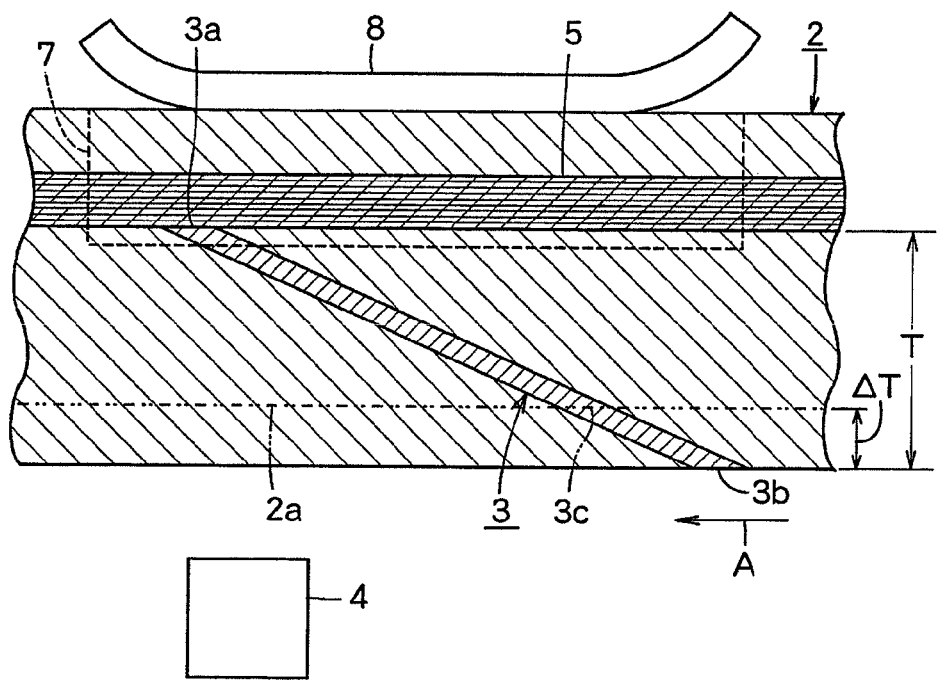
FIG. 2 is an enlarged sectional view of the part II in FIG. 1.

FIG. 2 is an enlarged vertical sectional side view of the part II in FIG. 1; and an enlarged view seen from the line III-III in FIG. 1.

A wear detector comprises a rubber magnet 3 embedded in a conveyor belt 2 wound on a pulley 1; and a magnetic sensor 4 detecting magnetic force from the rubber magnet 3.

The rubber magnet 3 comprises a plate magnetized along its thickness and embedded with an inclination upward in a running direction as shown by an arrow in FIGS. 1 and 2. As shown in FIG. 2, the proximal end 3a of the rubber magnet 3 contacts a reinforcement 5 and the distal end 3b is exposed on the surface of the conveyor belt 2, so that the rubber magnet 3 is embedded over a whole width of the conveyor belt 2.

The rubber magnet 3 comprises a bonded magnet in which magnet powder is dispersed and mixed in a rubber matrix which is molded like a sheet and magnetized along its thickness. The bonded magnet can be not only formed thin, but also is rich in flexibility following deformation of the conveyor belt 2.

The magnet powder is generally ferrite, but may be rare earth element magnets such as Nd Fe Boron and samarium Fe-N and Alnico magnet providing strong magnetic force.

The magnet sensor 4 may comprise a gaussmeter or a loop coil and is disposed as close as possible to a position where the rubber magnet 3 runs. The magnetic sensor 4 may preferably be disposed by the returning conveyor belt 2. Thus, material conveyed on the conveyor belt 2 is scraped off by a scraper 6 and can be detected at a clean portion.

Figure 3:
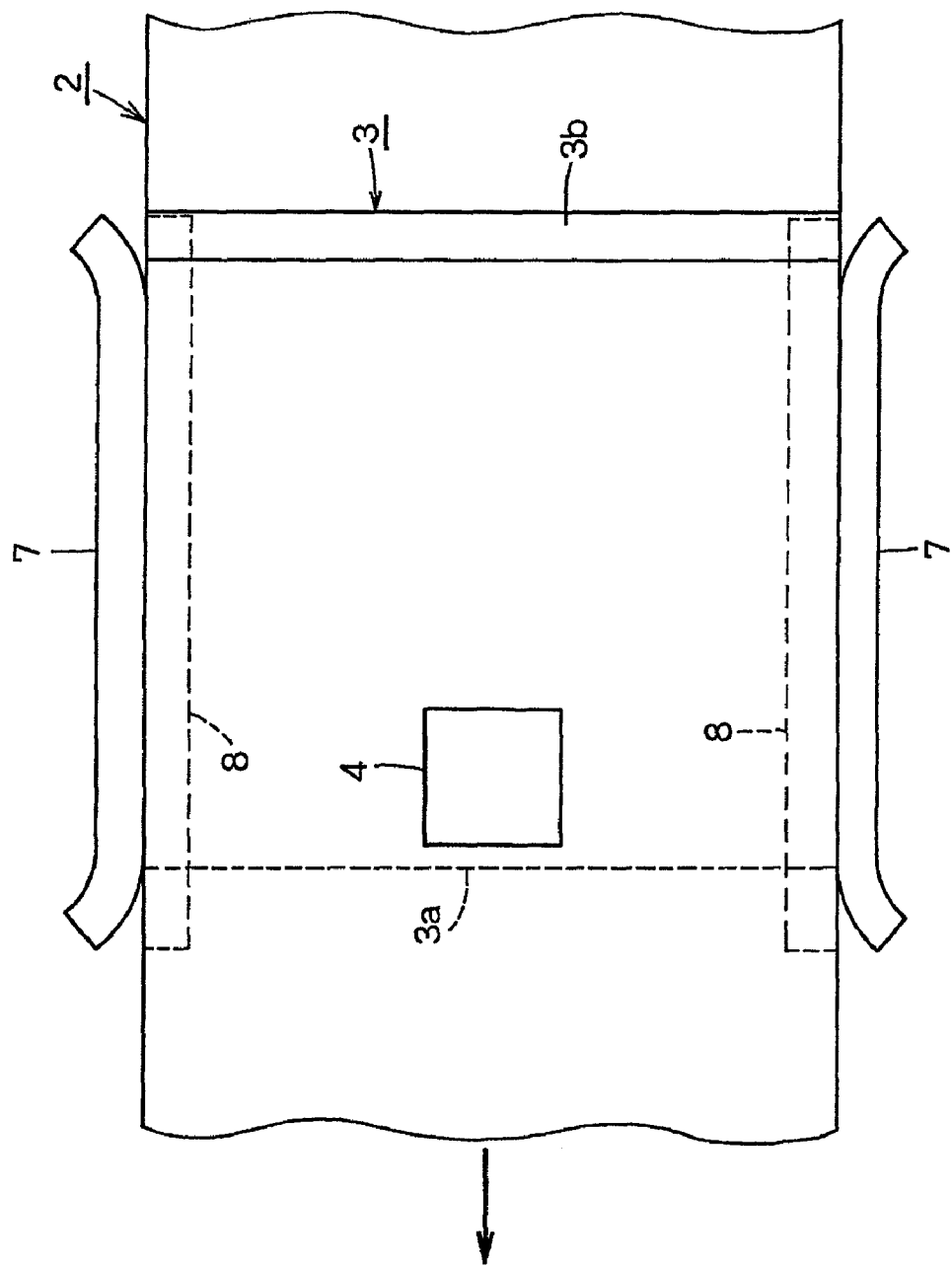
FIG. 3 is an enlarged view seen from the line III-III in FIG. 1.

In FIG. 3, a width guide 7 is provided to limit a width of the conveyor belt 2 running close to the magnetic sensor 4 and a thickness guide 8 is provided at a side opposite to the magnetic sensor 4 to keep relationship between the conveyor belt 2 and the magnetic sensor 4 constant.

Figure 4:
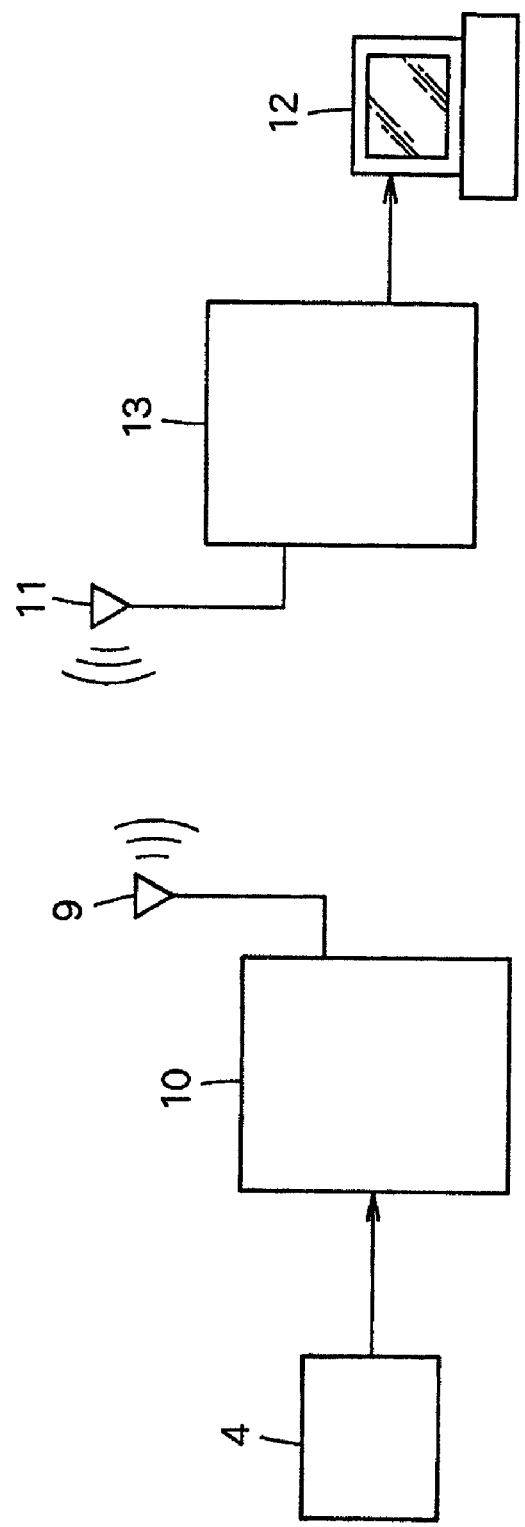
FIG. 4 is a block diagram of a control device.

FIG. 4 is an embodiment of a control device of a wear detector of a conveyor belt 2.

The control device comprises a scene operation control portion 10 in which a detected signal is inputted from the magnetic sensor 4 so that wear of the belt is operated and transmitted from a transmitter 9 and a central control potion 13 which receives the transmitted signal in a receiver 11 and outputs operated results to an output terminal 12 so that the control portion 13 generates a warning and stops the belt conveyor if wear goes beyond a predetermined value.

An embodiment of a wear detector will be described.

Figure 5:
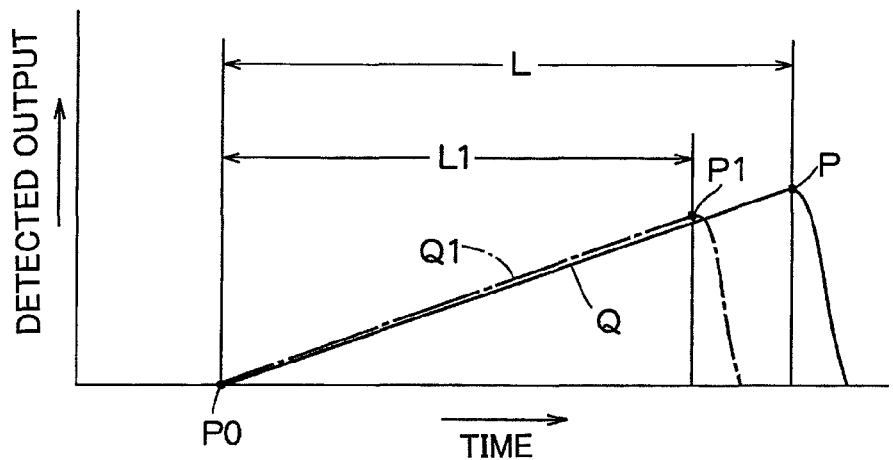
FIG. 5 is an output wave form from a magnetic sensor.

FIG. 5 shows an output wave form from the magnetic sensor 4.

The conveyor belt 2 runs in a direction of an arrow A in FIG. 2 and the rubber magnet 3 passes over the magnetic sensor 4, so that a signal depending on variation in magnetic force is outputted from the magnetic sensor 4. Wear starts from the front surface on which material is conveyed to allow the rubber magnet 3 to be shaved off from the distal end 3b.

In an initial condition when the conveyor belt 2 does not wear, a detected output is P0 when the proximal end 3a on which the rubber magnet 3 contacts the reinforcement 5 passes the magnetic sensor 4 ($\approx$0), inclined upward gradually and becomes the peak P which is a detected output of the end 3b of the rubber magnet 3 or the end face exposed on the surface of the conveyor belt 2. An initial output wave form Q between P0 and P is outputted from the magnetic sensor 4. Time between P0 and P is L. The time L is measured by a timer (not shown) in the scene operation control portion 10 or control portion 13.

If the conveyor belt 2 wears to a portion 2a as shown by a two-dotted line in FIG. 2, the rubber magnet 3 is shaved to a portion 3c as shown by a two-dotted line, so that the magnetic sensor 4 outputs a signal in the output wave form Q1 where the end face exposed on the surface of the conveyor belt 2 shows the peak P1. The time from P0 to P1 of the output wave form Q1 is L1.

In order to find $\Delta T$, the formula $\Delta T = (L-L1)/L \times T$ is calculated where T stands for the initial distance from the reinforcement 5 to the surface of the conveyor belt 1 and $\Delta T$ stands for wear of the conveyor belt. This is operated by the scene operation control portion 10, so that wear is found.

In the wear detector of this embodiment, the rubber magnet 3 is embedded with an inclination both upward in the running direction to enable a variation in magnetic force wave-form to read. Thus the single rubber magnet 3 enables wear to be detected exactly. The structure is simple and is not expensive.

Figure 6:
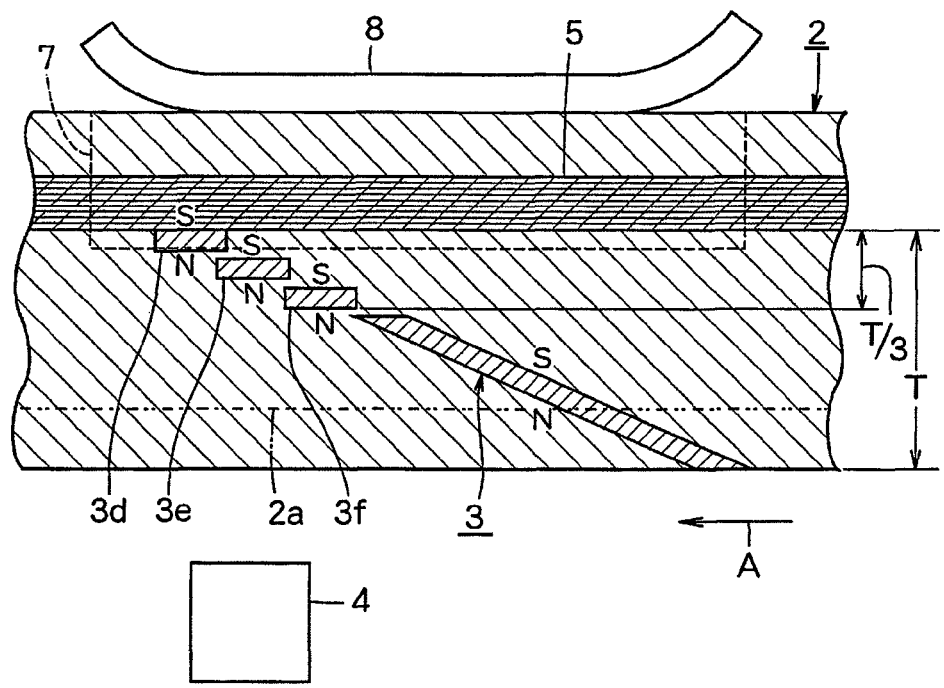
FIG. 6 is an enlarged view of the second embodiment of a wear detector and similar to FIG. 2.

FIG. 6 shows the second embodiment of the present invention and is an enlarged vertical sectional side view similar to FIG. 2. The same numerals are allotted to the same members as those in the first embodiment, and its detailed description will be omitted.

In this embodiment, a plurality of rubber magnets 3 is provided stepwise toward the surface of a conveyor belt 2 from a reinforcement in a conveyor belt 2 at least within the range of T/3 upward in a running direction to comprise the steps 3d, 3e, 3f.

The steps 3d, 3e, 3f of the rubber magnet 3 are overlapped along its thickness partially. But they need not to be overlapped.

By the structure, the starting point P0 can exactly be detected digitally improving detecting accuracy and life of the belt at the end of wear exactly.

The present invention is not limited to the above. For example, wear can be found owing to the difference (P−P1) in FIG. 5.

What is claimed is:

1. A wear detector of a conveyor belt, comprising:
   a rubber magnet magnetized along its thickness and embedded in the conveyor belt with an inclination upward in a running direction of the conveyor belt; and
   a magnetic sensor disposed close to a position where said rubber magnet passes, to detect variation in magnetic force owing to wear of the rubber magnet caused by wear of said conveyor belt.

2. A wear detector of claim 1, further comprising a reinforcement and an operation control portion connected to the magnetic sensor, the operation control portion calculating the formula to find ΔT when the conveyor belt runs at a constant speed:

$$\Delta T = (L - L1)/L \times T$$

where T stands for initial distance from the reinforcement to a surface of the conveyor belt when the conveyor belt does not wear, L stands for time between a starting point in variation of magnetic force detected by the magnetic sensor and a peak when the conveyor belt does not wear, ΔT stands for wear of the conveyor belt, and L1 stands for time between the starting point and a peak when the conveyor belt wears.

3. A wear detector of claim 2 wherein the rubber magnet is embedded with an inclination with respect to the conveyor belt such that one end of the rubber magnet contacts the reinforcement of the conveyor belt, while the other end is exposed on the surface of the conveyor belt.

4. A wear detector of claim 1 wherein a plurality of rubber magnets is embedded stepwise upward in a running direction of the conveyor belt between the surface of the conveyor belt and the reinforcement.

5. A wear detector of claim 4 wherein said plurality of rubber magnets is partially overlapped along thickness of the conveyor belt.

6. A wear detector of claim 4 wherein when an initial distance from the surface of the conveyor belt to the reinforcement is T, said plurality of rubber magnets is embedded at least within the range of T/3.

7. A wear detector of claim 1 wherein the rubber magnet comprises a bonded magnet magnetized by mixing a magnet powder in a rubber matrix.

\* \* \* \* \*